United States Patent [19]

Pickard et al.

[11] Patent Number: 4,580,668
[45] Date of Patent: Apr. 8, 1986

[54] LOCK-UP CLUTCH WITH A FRONT-MOUNTED PISTON DAMPER MODULE FOR A HYDRODYNAMIC FLOW UNIT

[75] Inventors: Jürgen Pickard, Wernau; Heinz Schultz, Hochdorf, both of Fed. Rep. of Germany

[73] Assignee: Daimler-Benz Aktiengesellschaft, Fed. Rep. of Germany

[21] Appl. No.: 536,641

[22] Filed: Sep. 28, 1983

[30] Foreign Application Priority Data

Oct. 2, 1982 [DE] Fed. Rep. of Germany ....... 3236621

[51] Int. Cl.⁴ ............................................. F16H 45/02
[52] U.S. Cl. ..................................... 192/3.29; 192/3.3
[58] Field of Search ....................... 192/3.29, 3.3, 3.33

[56] References Cited

U.S. PATENT DOCUMENTS

| | | | |
|---|---|---|---|
| 2,824,631 | 2/1958 | DeLorean | 192/3.3 X |
| 3,151,717 | 10/1964 | Kaptur et al. | 192/3.29 X |
| 3,185,273 | 5/1965 | Smirl | 192/3.3 X |
| 3,463,033 | 8/1969 | Fisher | 192/3.3 X |
| 4,027,757 | 6/1977 | Radke et al. | 192/3.29 X |
| 4,049,093 | 9/1977 | Vukovich et al. | 192/3.3 |
| 4,138,003 | 2/1979 | Malloy | 192/3.29 |
| 4,143,561 | 3/1979 | Melhorn | 74/730 |
| 4,173,270 | 11/1979 | Croswhite et al. | 192/3.29 |
| 4,188,805 | 2/1980 | Fall et al. | 64/27 C |

FOREIGN PATENT DOCUMENTS

| | | | |
|---|---|---|---|
| 2913099 | 10/1979 | Fed. Rep. of Germany . | |
| 3012966 | 10/1980 | Fed. Rep. of Germany . | |
| 0140920 | 8/1982 | Japan | 192/3.29 |
| 0200853 | 11/1983 | Japan | 192/3.29 |
| 2069632 | 8/1981 | United Kingdom | 192/3.29 |
| 2081401 | 2/1982 | United Kingdom . | |

Primary Examiner—Rodney H. Bonck
Assistant Examiner—Richard M. Lorence
Attorney, Agent, or Firm—Craig and Burns

[57] ABSTRACT

In a lock-up clutch, an annular piston has a clutch friction disc connected to the annular piston and a seal hub, which is connected to the annular piston and rotatably slipped over a counterseal hub. A damper using a spring and a damper supplying frictional resistance are located on the end face of the annular piston facing towards the casing shell. The dampers are connected, on the drive side, with at least one damper drive part connected to the annular piston and, on the output side, with a radially inner clutch hub positively engaged to a rotor hub connected to the turbine rotor.

The pressure surface of the annular piston is designed independently of the dimensions of the dampers because the counterseal hub is fixed on the rotor hub. A front hub protrusion connected rotationally solidly with the clutch hub and facing the rotor hub centers damper discs. An axially small space exists when the counterseal hub is located at a transition between the outer shell and the connecting flange and the hub protrusion facing the rotor hub is located radially inside the counterseal hub.

1 Claim, 1 Drawing Figure

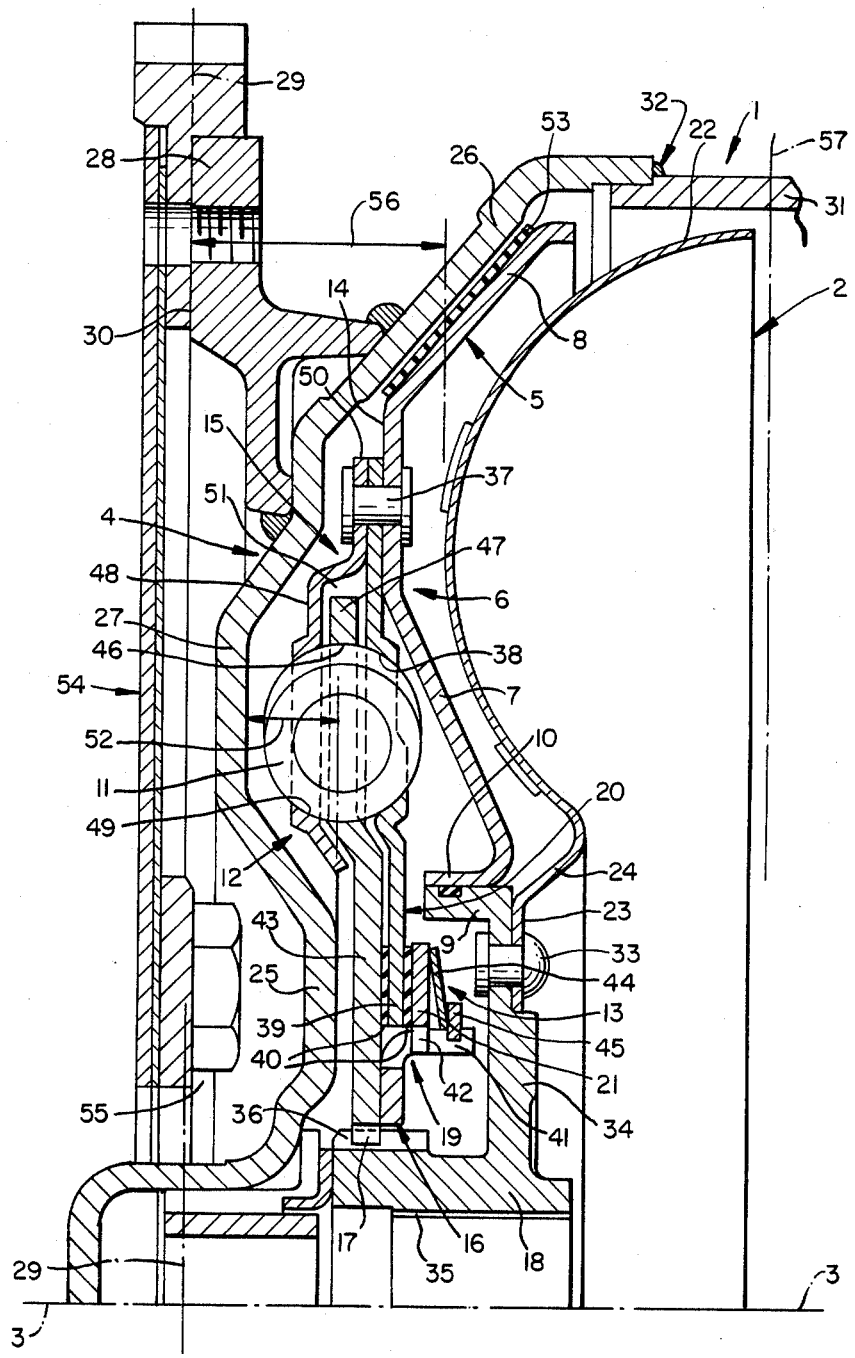

LOCK-UP CLUTCH WITH A FRONT-MOUNTED PISTON DAMPER MODULE FOR A HYDRODYNAMIC FLOW UNIT

The invention relates generally to a hydrodynamic flow unit.

More particularly, the invention relates to a hydrodynamic flow unit with a pump rotor, turbine rotor, a casing shell centered about the axis of rotation, rotationally-fixed with the pump rotor and accepting the turbine rotor, wherein a central annular piston located between casing shell and turbine rotor has, in its radially outer region, a clutch friction disc connected with respect to said piston and, in its radially inner region, a seal hub, which is connected rotationally fixed to the annular piston and can be rotatably slipped over a counterseal hub, a damper using rotational spring means and a damper supplying a frictional resistance, each of annular shape, are located on the end face of the annular piston facing the casing shell and are connected, on the drive side, to at least one damper drive part rotationally fixed connected to the annular piston and, on the output side, to a radially inner clutch hub, the clutch hub has positive engagement means for connecting to a rotor hub rotationally fixed connected to the turbine rotor, the counterseal hub is located fixed on the rotor hub and the outer shell of the turbine rotor is connected to the rotor hub by means of a radial connecting flange, and having a front hub protrusion rotationally fixed solidly to the clutch hub and facing the rotor hub for centering damper discs.

In a known lock-up clutch (German Offenlegungsschrift No. 3,012,966) an annular secondary clutch disc provided with window openings for the torsional damping springs is inserted, so that no relative movement can occur, in an annular groove of a cylindrical outer casing of the clutch hub, on each of the two end faces of which secondary clutch disc, damper disc stacks are located and centered on the outer casing. The clutch hub axially located between the casing shell and the rotor hub, with its outer shell also used as the counterseal hub for the seal hub of the annular piston, has a toothed ring engaging by means of outer axial spline teeth with corresponding inner spline teeth of the rotor hub and axially connecting with the outer shell. Since centering surfaces and counterseal surface are formed by the same cylindrical outer shell of the coupling hub, it is not directly possible to have the capability of designing the pressure surface of the annular piston independently of the dampers. In addition, the construction of this lock-up clutch is also axially long for the same reason.

In a known lock-up clutch of a different generic type (German Offenlegungsschrift No. 2,913,099), only a torsion spring damper is used, which damper is located axially between annular piston and turbine rotor, whose outer shell is also connected to the output side damper discs instead of the rotor hub, for example, by welding. With this lock-up clutch, the pressure surface of the annular piston cannot be dimensioned independently of the damper because the appropriate seal hubs are located concentrically within the dampers.

In another known lock-up clutch of a different generic type (U.S. Pat. No. 4,143,561), a torsion spring damper and a friction damper are located axially between annular piston and turbine rotor, whose rotor hub has an end face toothed protrusion for a corresponding rotationally fixed engagement of the clutch hub and an axially connecting protrusion of tapering diameter, whose outer surface is used as the counterseal hub and whose inner surface is used for the rotationally fixed connection with a central shaft by means of spline teeth. With this rotor hub arrangement, the clutch hub directly overlaps the seal hub of the annular piston, so that, again, the pressure surface of the latter cannot be directly configured independently of the clutch hub as the output part of the dampers.

This problem does not arise in a further known lock-up clutch of a different generic type (British Pat. No. 2,081,401) because in this clutch, the annular piston is connected in its radially outer piston region by means of the torsion spring damper to the outer shell and in its radially central piston region, together with the friction damper, by means of an axially flexible disc to the rotor hub of the turbine rotor. In this, the radially inner edge of the flexible disc together with the connecting flange of the outer shell is riveted to the rotor hub and the counterseal hub is formed at the transition between outer shell and connecting flange to the rotor hub.

An object of the invention consists substantially in making it possible, in a lock-up clutch, to establish the dimensions of the effective pressure surface of the annular piston independently of the dampers without increasing the axial installed length of the hydrodynamic flow unit.

It is another object of the invention to provide a lock-up clutch having a front-mounted piston damper module for a hydrodynamic flow unit with a pump rotor, a turbine rotor, a casing shell centered about the axis of rotation, rotationally fixed with respect to the pump rotor and accepting the turbine rotor, wherein a central annular piston located between casing shell and turbine rotor has, in its radially outer region, a clutch friction disc connected rotationally fixed to it and, in its radially inner region, a seal hub, which is connected rotationally fixed to the annular piston and which can be rotatably slipped over a counterseal hub, a damper using rotational spring means and a damper supplying a frictional resistance, each of annular shape, are located on the side of the annular piston facing the casing shell and are connected, on the drive side, to at least one damper drive part rotationally fixed to the annular piston and, on the output side, to a radially inner clutch hub, the clutch hub having positive engagement means for connecting to a rotor hub rotationally solidly connected to the turbine rotor, the counterseal hub being located solidly on the rotor hub and the outer shell of the turbine rotor is connected to the rotor by means of a radial connecting flange, and having a front hub protrusion rotationally solidly connected to the clutch hub and facing the rotor hub for centering damper discs, wherein the counterseal hub is located at the transition between the outer shell and the connecting flange and only a hub protrusion facing the rotor hub being is used and located radially within the counterseal hub.

It is another object of the invention to provide a hydrodynamic flow unit using a pump rotor, a turbine rotor, a casing shell (which is rotationally fixed with the pump rotor, is centered about the rotational axis and accepts the turbine rotor) and using a lock-up clutch which has a preassembled piston damper module, wherein a central annular piston located between casing shell and turbine rotor has, in its radially outer region, an annular clutch friction disc, which is rotationally solid with it and, in its radially inner region, a seal hub, which is rotationally solid with it and can be rotatably slipped over a counterseal hub, a damper employing rotational spring means and a damper providing frictional resistance are each of annular shape and located on one side of the annular piston with respect to the turbine rotor, the dampers being connected, on the drive side, with at least one damper drive part rotationally fixed with the annular piston and, on the output side, with a radially inner clutch hub, which has positive engagement means for connection to a rotor hub rotationally fixed with the turbine rotor, wherein the counterseal hub is fixedly positioned on the rotor hub and the dampers being located on the end face facing the casing shell.

It is another object of the invention to provide a hydrodynamic flow unit with a front hub protrusion for centering the damper discs, the hub protrusion being rotationally fixed with the clutch hub and facing the rotor hub, characterized in that only a hub protrusion facing the rotor hub is used.

It is another object of the invention to provide a hydrodynamic flow unit of the foregoing type wherein the outer shell of the turbine rotor is connected to the rotor hub by means of a radial connecting flange, characterized in that the counterseal hub is located at the transition between the outer shell and the connecting flange.

It is another object of the invention to provide a hydrodynamic flow unit of the foregoing type wherein the hub protrusion is located radially inside the counterseal hub.

It is yet another object of the invention to provide a hydrodynamic flow unit of the foregoing type wherein the casing shell has, in its end wall opposite to the pump rotor, a casing recess located axially offset relative to the casing section operating in conjunction with the clutch friction disc and, on the outside of the end wall, fixedly held connecting eyes, each of whose contact surfaces lies in a common plane normal to the axis of rotation and the casing recess extends, at least approximately, to the plane of the contact surfaces, and the rotational spring means are located at least partially within the casing recess.

These and other objects, features, and advantages of the present invention will become more apparent from the following description when taken in connection with the accompanying drawings which show, for the purpose of illustration only, one embodiment in accordance with the present invention.

Referring now to the single FIGURE of the drawing, an axial section through the hydrodynamic flow unit is shown in a plane containing the axis of rotation 3—3.

A torque converter is used as the flow unit, only the front end of the outer shell 31 of the pump rotor 1 of the torque converter being shown, which front end is connected rotationally fixedly and liquid-tight by means of a weld connection 32 to a casing shell 4 which accepts the turbine rotor 2 of the torque converter. The stator of the torque converter is not shown. The outer shell 22 of the turbine rotor 2 undergoes a radially inward transition at transition flange 24 to become a connecting flange 23, which is connected fixedly by means of rivets 33 to a corresponding connecting flange 34 of a rotor hub 18. The rotor hub 18 can be connected by means of inner splines 35 to a central shaft, which, for example, can be the input shaft of an automatic gearbox. Connecting eyes 28, whose contact surfaces 30 lie in a common plane 29 normal to the axis of rotation, are welded to the outside of the casing shell 4. The casing shell 4 can be driven in the conventional manner by the crankshaft of an internal combustion engine by means of the fastening eyes 28. The turbine rotor 2 can be coupled to the casing shell 4 by means of a lock-up clutch 5. The lock-up clutch 5 has a front-mounted piston damper unit module 6 having an annular piston 7 which, in its radially outer region, is formed integrally with a clutch friction disc 8 and, in its radially inner region, has a seal hub 10, which latter is rotatably slipped over a counterseal hub 9, which is rotationally fixed formed on the connecting flange 34 and lies in the region of the transition flange 24. The annular piston 7 is connected to a clutch hub 16 by means of both a damper 12 using rotational spring means 11 and a damper 13 supplying a frictional resistance, which clutch hub 16 can be coupled to the rotor hub 18 by means of corresponding splines 17 and 36. Damper 12 is located radially inward with respect to end face 14. Dampers 12 and 13 are positioned on the side of the annular piston 7 which is remote from turbine rotor 2 and are driven by at least one damper drive part 15, which is rotationally fixedly connected to the annular piston 7 by means of rivets 37. The two-part damper drive part 15 has a damper disc 20 acting on both dampers 12 and 13, which damper disc 20 has, in its radially central region, window openings 38 to accept the torsion springs 11, and, at its inner edge 39, frictional linings 40 on both sides. To the clutch hub 16 is welded and angular hub protrusion 19, which is located concentrically and within the counterseal hub 9 and has axial grooves 41, with which radially internal drive teeth 42 of a further damper disc 21 engage. The inner edge 39, with its frictional linings 40, of the damper disc 20 is pressed between the damper disc 21 and a hub flange 43 of the clutch hub 16 by means of a plate spring 44, which is pushed onto the hub protrusion 19 and is supported against a circlip 45 inserted into a peripheral groove of the hub protrusion 19. A further damper disc 48 offset at its outer edge 50 to provide an axial annular gap 51 and held on the annular piston 7 by means of the rivets 37 is also provided with window openings 49 for the torsion springs 11. The hub flange 43 located with its outer edge 47 within the annular gap 51 is also provided with window openings 46 in the region of the torsion springs 11.

In the event of relative rotations between damper drive part 15 and hub flange 43, each of the torsion springs 11 is supported at one end on the window openings 38, 49 and at the other end on the window opening 46.

A casing recess 27 having an axial displacement 52 relative to the front end wall 25 of the casing shell 4 extends into the vicinity of the plane 29-29 of the contact surfaces 30. In this way, the damper disc 48 and the torsion spring 11, for part of its cross-section, lie within the casing recess 27.

In order to increase the clutch torque, the clutch friction disc 8, its friction lining 53 and the associated casing section 26 of the casing shell 4 are cone-shaped.

In a conventional manner, a converter drive disc 54 is screwed onto the fastening eyes 28, which converter drive disc 54, by means of a screw connection 55, is rotationally fixedly connected at a radially inwards position to a crankshaft flange.

By means of the spatial and constructional separation of the seal hub 10 from the friction damper 13, the effective pressure surface of the annular piston 7 can be shaped independently of the rotational vibration dampers 12 and 13.

The axial distance 56 between the plane 29–29 and the turbine rotor 2 is kept very short by means of the following mutually complementary measures:

The hubs 9 and 10 are located in the region of the transition 24, i.e., radially underneath the outer shell 22 of the turbine rotor 2.

The hub protrusion 19 is located radially underneath the counterseal hub 9.

The friction damper 13 is, in part, located radially between counterseal hub 9 and hub protrusion 19.

Both dampers 12 and 13, together with the casing recess 27, are located on the same side of the annular piston 7.

The lock-up clutch 5 is cone-shaped, and the screw connection 55 is located radially underneath the casing recess 27.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A lock-up clutch for a hydrodynamic flow unit, the hydrodynamic flow unit having a pump rotor, a turbine rotor having an outer shell and a connecting flange, a casing shell which is central with respect to the rotational axis and nonrotatable with respect to the pump rotor and receiving the turbine rotor, the lock-up clutch comprising a preassembled piston-damper module with a central annular piston and having a drive side and a take-off side and disposed between the casing shell and turbine rotor has in its radially outer area an annular clutch friction disk nonrotatably attached to the central annular piston, and in its radially inner area a sealing hub nonrotatable with respect to the annular piston and rotatably mounted on a counter sealing hub, a first annular damper using a rotational spring means and a second annular damper offering frictional resistance, are mounted to the side of the annular piston facing the casing shell and nonrotatably connected on the drive side with at least one damping drive part with respect to the annular piston and on the take-off side with a radially inner clutch hub, the clutch hub having positive engaging means for engaging a rotor hub nonrotatable with respect to the turbine rotor, with the counter sealing hub being nonrotatably mounted on the rotor hub, and the outer shell of the turbine rotor being connected by a radial transition flange and by way of the connecting flange with the rotor hub and a hub protrusion mounted to the clutch hub and facing the rotor hub, for centering at least a damping disk, and wherein the countersealing hub is located between the connecting flange and the sealing hub and the hub protrusion is disposed radially inside said countersealing hub.

* * * * *